(12) United States Patent
Breakenridge et al.

(10) Patent No.: US 11,742,612 B2
(45) Date of Patent: Aug. 29, 2023

(54) ADIABATIC COAXIAL CABLE COUPLING

(71) Applicant: Keysight Technologies, Inc., Santa Rosa, CA (US)

(72) Inventors: Eric Breakenridge, Clackmannanshire (GB); Han Chern Hoe, Singapore (SG); Chee Foo Lum, Penang (MY)

(73) Assignee: KEYSIGHT TECHNOLOGIES, INC., Santa Rosa, CA (US)

(*) Notice: Subject to any disclaimer, the term of this patent is extended or adjusted under 35 U.S.C. 154(b) by 626 days.

(21) Appl. No.: 16/669,086

(22) Filed: Oct. 30, 2019

(65) Prior Publication Data
US 2021/0135398 A1 May 6, 2021

(51) Int. Cl.
H01R 13/533 (2006.01)
H01R 24/52 (2011.01)
H01R 13/66 (2006.01)
H01P 3/08 (2006.01)
G01K 17/00 (2006.01)
H01P 3/02 (2006.01)
H01R 103/00 (2006.01)

(52) U.S. Cl.
CPC ........ H01R 13/533 (2013.01); G01K 17/006 (2013.01); H01P 3/026 (2013.01); H01P 3/08 (2013.01); H01R 13/6683 (2013.01); H01R 24/52 (2013.01); H01R 2103/00 (2013.01)

(58) Field of Classification Search
CPC .. H01R 13/533; H01R 13/6683; H01R 24/52; H01R 2103/00; H01R 9/0503; H01R 9/05; H01R 24/542; H01P 3/08; H01P 3/026; H01P 5/02; G01K 17/006; G02B 6/12004; G02B 6/36; G02B 6/02076; G02B 6/305
USPC ............................ 333/34; 439/578, 582, 583
See application file for complete search history.

(56) References Cited

U.S. PATENT DOCUMENTS

| | | | | |
|---|---|---|---|---|
| 6,053,769 | A * | 4/2000 | Kubota | H01R 24/40 174/75 C |
| 9,431,728 | B2 * | 8/2016 | Shaw | H01R 9/0521 |
| 10,873,166 | B2 * | 12/2020 | Hughes | H01R 13/622 |
| 2007/0069833 | A1 * | 3/2007 | Serban | H01P 1/2007 333/34 |
| 2017/0347446 | A1 * | 11/2017 | Fisné | H01P 3/08 |
| 2018/0011249 | A1 | 1/2018 | Zhu et al. | |
| 2018/0253002 | A1 * | 9/2018 | Shi | G03F 7/0005 |

OTHER PUBLICATIONS

Saood Ahmad et al., "Realization of 2.4mm coaxial microcalorimeter system as national standard of microwave power from 1 MHz to 50 GHz", Measurement 116 (2018), pp. 106-113.

Raka Ramona Day et al., "Design and Simulation of Wideband Rectangular Micro-Coaxial lines to Coplanar Waveguide Transitions", 2015 IEEE Applied Electromagnetics Conference (AEMC), pp. 1-2.

(Continued)

Primary Examiner — Gary F Paumen

(57) ABSTRACT

An adiabatic coaxial cable connector includes a chassis, and a planar transmission line within the chassis and having first and second ends. The coaxial cable connector further includes a first coaxial-to-planar transition within the chassis and connected to the first end of the planar transmission line, and a second coaxial-to-planar transition within the chassis and connected to the second end of the planar transmission line.

19 Claims, 6 Drawing Sheets

(56) References Cited

OTHER PUBLICATIONS

Toshihisa Kamei et al., "Wide-Band Coaxial-to-Coplanar Transition", IEICE Trans. Electron., vol. E90-C, No. Oct. 10, 2007, pp. 2030-2036.
Jae-Yong Kwon et al., "Adiabatic Design for a Coaxial Transmission Line", IEEE Transactions on Instrumentation and Measurement, vol. 63, No. 7, Jul. 2014, pp. 1760-1768.
Željko Martinović et al., "Electromagnetic analysis of adiabatic coaxial line with applied air gap", 2017 25th International Conference on Software, Telecommunications and Computer Networks (SoftCOM), pp. 1-4.
Emil Vremera et al., "Broadband coaxial microcalorimeter efficiency determination based on thermal simulation and vector network analyzer measurements", Bul. Inst. Polit. Iasi Electrot. Energy Electron (2002), pp. 65-76.

* cited by examiner

ADIABATIC COAXIAL CABLE COUPLING

BACKGROUND

There are many examples of situations in test and measurement where a system or device under test (DUT) is subjected to a range of environmental conditions. In general, the test equipment used to measure the performance is not subjected to the same conditions, and typically is it desired to isolate the test environment of the DUT from the associated test equipment. By doing so it can be assumed that the test equipment is independent of the test environment. Conversely, equipment subject to environmental stress can be disassociated from stray thermal paths through connections to external test equipment. Such stray thermal paths might influence the equipment under test in ways that are different from the conditions that the test chambers are intended to simulate. The ideal situation is that the equipment under test is isolated from external influences, but this is difficult to achieve if there is also a need to have a connection to external test equipment.

In radio-frequency (RF) power metrology applications, it is imperative that the sensing element is completely isolated from the external environment. Primary power standards are used to measure the power terminated in a transmission line. Generally, the temperature rise is sensed in the termination and that can be associated with RF power. The efficiency of such a standard is calculated by measuring the temperature rise of the whole assembly compared to what is reported by the standard. To provide an effective measurement of the efficiency it is important to ensure that there are no thermal paths from the power standard to the external environment. Galvanic connections to the standard need to have the minimum thermal conductance possible to obtain the best performance.

National Metrology Institutes (NMIs) and other academic researchers have studied this problem. Their solutions have been in pure coaxial structures or rectangular waveguides. The fragility of the center conductor in coaxial waveguides makes this an exceedingly difficult component to assemble. In addition, there is a break in the outer conductor required to reduce the thermal conductivity. The RF and mechanical performance is compromised and limits the use of coaxial microcalorimeters to <=18 GHz (type-N) in many NMIs. Some labs do persist with coaxial up to 50 GHz, however their measurement uncertainty is not as good as rectangular waveguide standards. Rectangular waveguides can be less problematic because there is only a surface to deal with.

SUMMARY

According to an aspect of the inventive concepts, an adiabatic coaxial cable connector is provided. The adiabatic coaxial cable connector includes a chassis, and a planar transmission line within the chassis and having first and second ends. The coaxial cable connector further includes a first coaxial-to-planar transition within the chassis and connected to the first end of the planar transmission line, and a second coaxial-to-planar transition within the chassis and connected to the second end of the planar transmission line.

The first and second coaxial-to-planar transitions may include respective adapters exposed at opposite ends of the chassis and each configured to operatively engage a fitting of a coaxial cable.

A thermal conductivity of the chassis may be less than 0.300 watts per meter-kelvin. The chassis may be formed of polycarbonate or acrylonitrile butadiene styrene (ABS).

The planar transmission line may be a coplanar waveguide (CPW), and a substrate of the CPW may have a thermal conductivity of less than 5 watts per meter-kelvin. The substrate of the CPW may be formed of at least one of fused silica and quartz.

The chassis may include a central body surrounding at least a portion of the planar transmission line, and opposite coupling nuts containing at least a portion of the first and second coaxial-to-planar transitions, respectively. At least one of the coupling nuts may be detachably connected to the central body. The central body may be a cylinder extending lengthwise around the planar transmission line.

The planar transmission line may be one of a microstrip or a stripline.

According to another aspect of the inventive concepts, an adiabatic coaxial cable connection is provided. The adiabatic coaxial cable connection includes a first coaxial cable having a first end and a second coaxial cable having a second end. The adiabatic coaxial cable connection further includes a coaxial cable connector including a planar transmission line, the planar transmission line operatively connected between the first and second ends of the respective first and second coaxial cables.

The coaxial cable connection may include a chassis containing the planar transmission line, and the chassis may have a thermal conductivity of less than 0.300 watts per meter-kelvin.

The planar transmission line may include a substrate having a thermal conductivity of less than 5 watts per meter-kelvin.

The chassis may be formed of polycarbonate or acrylonitrile butadiene styrene (ABS), and a substrate of the planar transmission line may be formed of fuse silica or quartz.

The planar transmission line may be a coplanar waveguide (CPW).

The planar transmission line may be a microstrip or a stripline.

According to yet another aspect of the inventive concepts, an adiabatic system is provided.

The adiabatic system includes a chamber including a chamber wall and defining a thermodynamically controlled process space, a test sensor located within the thermodynamically controlled process space, and an RF generator located external the thermodynamically controlled process space. The adiabatic system further includes a coaxial cable connector including a chassis, a planar transmission line within the chassis and having first and second ends, a first coaxial-to-planar transition within the chassis and connected to the first end of the planar transmission line, and a second coaxial-to-planar transition within the chassis and connected to the second end of the planar transmission line. The adiabatic system still further includes a first coaxial cable coupled between the test sensor and the first coaxial-to-planar transition of the coaxial cable connector, and a second coaxial cable coupled between the RF generator and the second coaxial-to-planar transition of the coaxial cable connector.

A thermal conductivity of the chassis may be less than 0.300 watts per meter-kelvin, and a substrate of the planar transmission line may have a thermal conductivity of less than 5 watts per meter-kelvin.

The adiabatic system may be a microcalorimeter.

BRIEF DESCRIPTION OF THE DRAWINGS

The above and other aspects and features of the inventive concepts will become readily apparent from the detailed description that follows, with reference to the accompanying drawings, in which.

DETAILED DESCRIPTION

Throughout the drawings, the same or similar components are identified by like reference numbers. Separately, it is noted that the drawings are not necessarily drawn to scale. For example, the relative thicknesses of layers may be exaggerated for ease of illustration. Also, while one layer may be illustrated as directly deposited on another, the inventive concepts encompass the provision of an intervening layer or layers unless otherwise stated. Likewise, while one component may be illustrated as directly coupled to another, the inventive concepts encompass the provision of an intervening component or components unless otherwise stated.

As is explained in the description of the embodiments that follows, the inventive concepts provide an adiabatic coaxial line by converting signal propagation from coaxial to planar and back to coaxial. The section where the signal is in a planar transmission mode is easier to control thermally, and thus can be constructed in a robust and repeatable manner to provide an effective thermal isolation barrier. As examples, this planar transmission section can be physically realized by a coplanar waveguide, a microstrip or a stripline, with each being formed of materials having adiabatic properties.

Figure 1:
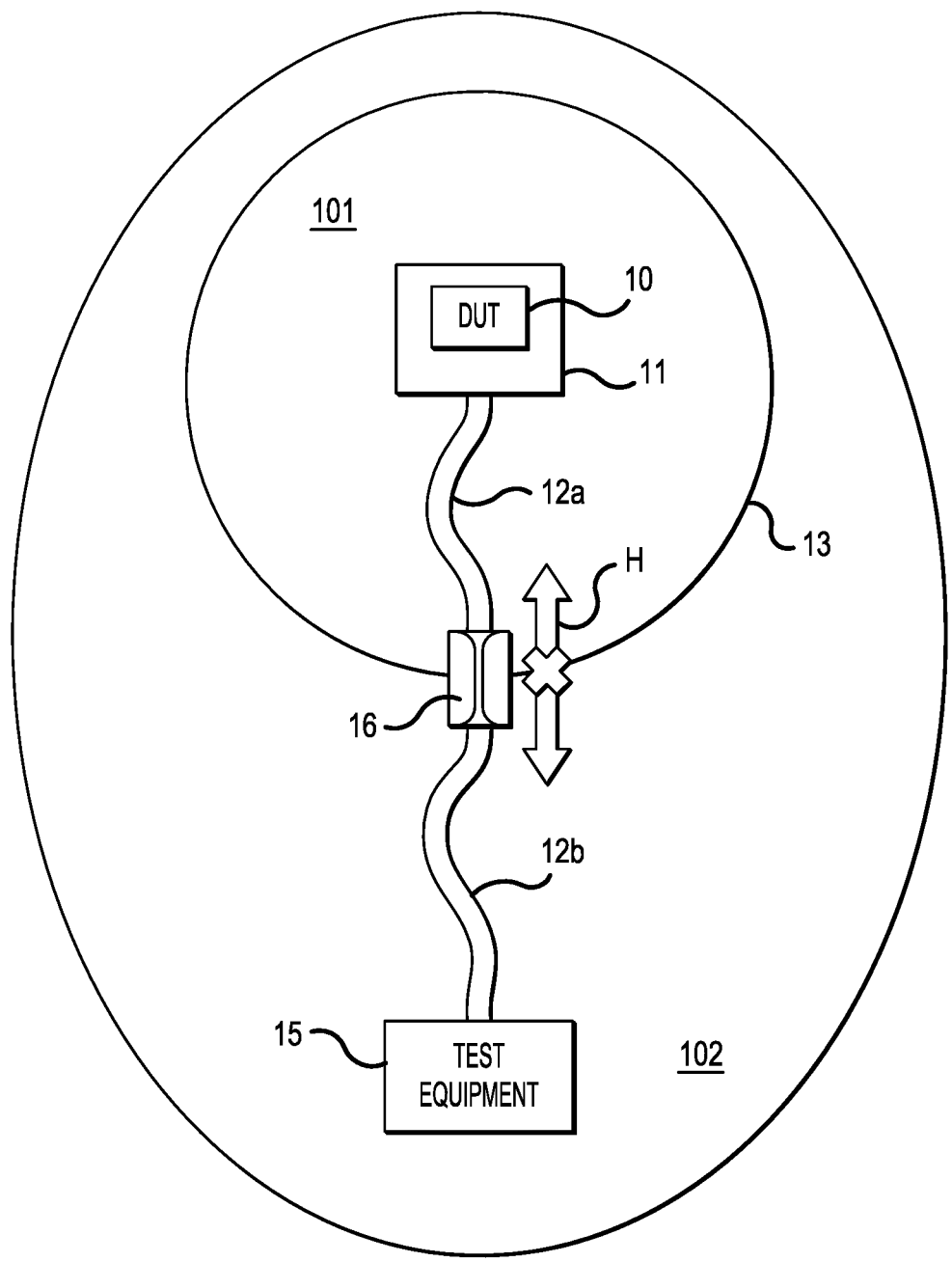
FIG. 1 is a conceptual view of a test system for reference in describing embodiments of the inventive concepts.

Attention is directed to the conceptual view of a test system shown in FIG. 1. Reference number 101 denotes a controlled test environment containing a device under test (DUT) 10 coupled to or within a sensing device 11. The sensing device 11 senses a physical property of the DUT 10 and is in RF communication with an external environment 102 via a coaxial cable 12a. The external environment 102 contains test equipment 15. The controlled test environment 101 is thermally isolated from the external environment 102 by a thermal barrier 13. The test equipment 15 of this example is for transmitting and/or receiving an RF electrical signal to and/or from the sensing device 11 via another coaxial cable 12b.

In the example of this embodiment, the sensing device 11 is sensitive to thermal fluctuations, and it is imperative that the controlled test environment 101 be thermally isolated from the external environment 102. As such, galvanic connections to the controlled test environment 101 need to have the minimum thermal conductance possible to obtain the best performance, and equipment within the controlled test environment 101 should be disassociated from stray thermal paths through connections to equipment in the external environment 102. Such stray thermal paths might influence the DUT 10 in ways that are different from the conditions that the controlled test environment 101 is intended to simulate.

In the example of FIG. 1, one such stray thermal path H is the coaxial cable connection (including cables 12a and 12b) between the sensing equipment 11 and the test equipment 15. To enhance the adiabatic properties of the connection, at least some embodiments herein are characterized by converting the coaxial signal propagation to/from the sensor 11 to planar propagation at or near the barrier between controlled test environment 101 and external environment 102, and then back to coaxial signal propagation to/from the test equipment 15. This is represented in FIG. 1 by a planar transmission line 16. The planar transmission line 16 (i.e., where the signal is in a planar transmission mode) is easier to control thermally while at the same time offers excellent RF (or microwave) transmission properties. This allows for the insertion of an adiabatic barrier (as represented by the X in FIG. 1) having favorable RF transmission characteristics between the controlled test environment 101 and external environment 102.

Figure 2:
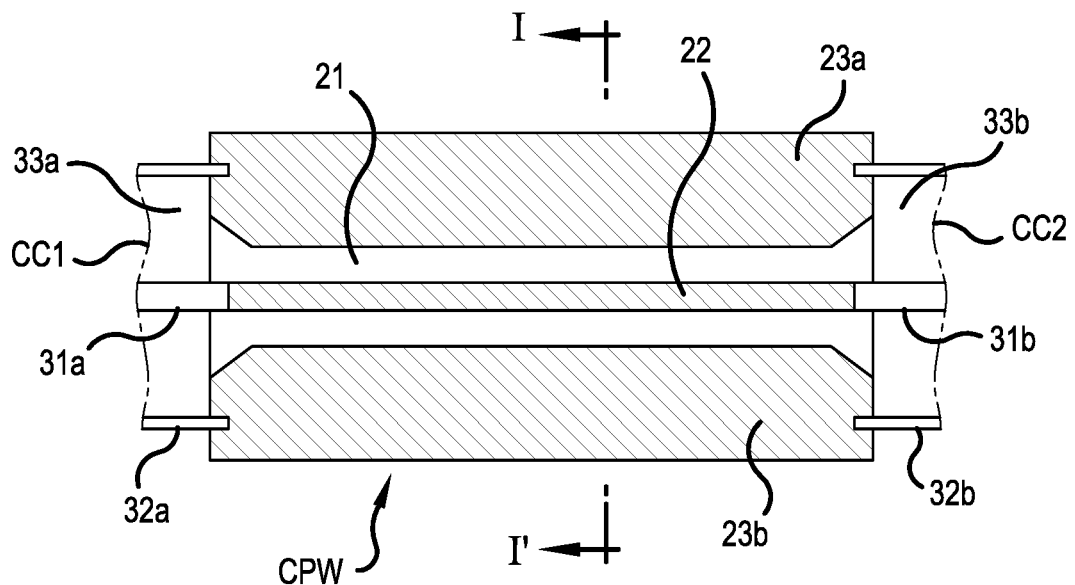
FIG. 2 is a top view of an adiabatic coaxial cable connection including a coplanar waveguide (CPW) according to an embodiment of the inventive concepts.

FIG. 2 is a top schematic view of an embodiment of an adiabatic coaxial connection according to an embodiment of the inventive concepts. In the example of this embodiment, the planar transmission line is realized by a coplanar waveguide (CPW). Coplanar waveguides are known to have excellent microwave-frequency transmission properties, and offer the advantage of being readily fabricated and repeated using well-established printed circuit board technologies.

Referring to FIG. 2, the CPW includes a central conducting line 22 printed onto a surface of a dielectric substrate 21, and a pair of ground (return) conductors 23a and 23b on either side of the central conducting line 22. The central conducting line 22 is used for signal transmission. All three conductors 22, 23a and 23b are on the same side of the thin-film dielectric substrate 21, and hence are coplanar. The ground conductors 23a and 23b are separated from the central conducting line 22 by small gaps, which may be constant along all or part of the length of the central conducting line 22. In the example shown in FIG. 2, the gaps flare out at opposite ends of the central conducting line 22, but the inventive concepts are not limited in this fashion.

Figure 3A:
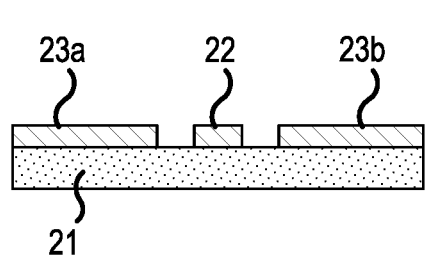
FIGS. 3A and 3B are cross-sectional views of the coplanar waveguide (CPW) taken along line I-I' of FIG. 2 according to embodiments of the inventive concepts.

FIG. 3A is a cross-sectional view taken along line I-I of the CPW of FIG. 2 according to an embodiment of the inventive concepts. As shown, the CPW includes the thin-film dielectric substrate 21. On an upper surface of the thin-film dielectric substrate 21 is the central conducting line 22 and the pair of ground conductors 23a and 23b on opposite sides of the central conducting line 22.

Figure 3B:
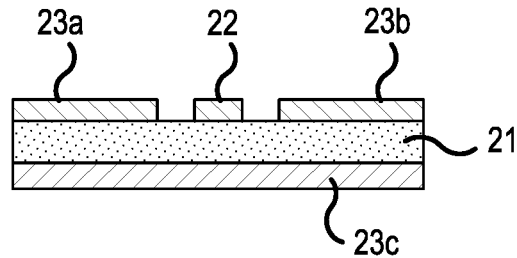

FIG. 3B is a cross-sectional view taken along line I-I of the CPW of FIG. 2 according to another embodiment of the inventive concepts. Like the example of FIG. 3A, the CPW of this embodiment the thin-film dielectric substrate 21 with the central conducting line 22 and pair of ground conductors 23a and 23b on its upper surface. The embodiment of FIG. 3B differs from that of FIG. 3A by an additional ground plane conductor 23c located on a lower surface of the thin-film dielectric substrate 21. Although not shown, the ground plane 23c may be electrically coupled to the ground conductors 23a and 23b by conductive vias extending through the thin-film dielectric substrate 21.

Returning to FIG. 2, the CPW is connected at opposite ends to a first coaxial cable CC1 and a second coaxial cable CC2. The first coaxial cable CC1 includes a central conductor 31a, a tubular conducting shield 32a, and a tubular insulating layer 33a between the central conductor 31a and the tubular conducting shield 32a. Likewise, the second coaxial cable CC2 includes a central conductor 31b, a tubular conducting shield 32b, and a tubular insulating layer 33b between the central conductor 31b and the tubular conducting shield 32b. The inventive concepts are not limited to any particular construction or material make-up of the coaxial cables CC1 and CC2. For example, the central conductors 31a and 31b may be solid or stranded, and may be gold or silver plated. As another example, the tubular insulating layers 33a and 33b may be plastic or some other insulating material, and may include air gaps. As yet another example, the tubular conducting shield may be solid or braided, and may be formed of copper or some other metal.

Still referring to FIG. 2, an adiabatic coaxial cable connection is established by electrically connecting the central conductor 31a of the first coaxial cable CC1 to one end of the central conducting line 22 of the CPW, and by electrically connecting the central conductor 31b of the second coaxial cable CC2 to the other end of the central conducting line 22 of the CPW. In addition, the tubular conducting shield 32a of the first coaxial cable CC1 is electrically connected to the ground conductors 23a and 23b at the one end of the CPW, and the tubular conducting shield 32b of the second coaxial cable CC1 is electrically connected to the ground conductors 23a and 23b at the other end of the CPW. These connections can be by direct connection of the components of the coaxial cables CC1 and CC2 and the planar conductors of the CPW as represented in FIG. 2, or by an intervening connector (not shown) which mates the components of the coaxial cables CC1 and CC2 to the planar conductors of the CPW. Separately, the configuration of FIG. 2 may be designed to have non-attenuating S-parameters, that is, where the S11 and S22 parameters approach 0 and the S21 and S12 parameters approach 1.

In the meantime, the thin-film dielectric substrate is generally made from a ceramic material optimized for good RF properties, such as low loss, and good manufacturing properties. In addition, the material of thin-film dielectric substrate 21 according to the embodiments may also be selected to have very low thermal conductivity of, for example, less than 5 watts per meter-kelvin. That is, a standard selection for CPW substrate might be alumina or sapphire, but these have a thermal conductivity around 30 watts per meter-kelvin. Selecting fused silica/quartz instead will result in a thermal conductivity closer to 1 watt per meter-kelvin, thus adding to the adiabatic properties of the connection.

It is noted here that the inventive concepts are not limited to the use of a CPW such as that shown in FIG. 2. Examples of other electrical planar transmission line structures that may be used include microstrips and striplines.

Figure 4:
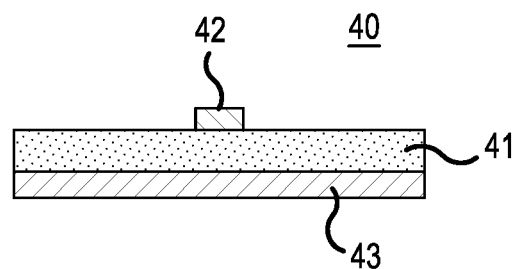
FIG. 4 is a cross-sectional view of a microstrip that may constitute a planar transmission line according to an embodiment of the inventive concepts.

FIG. 4 the cross-sectional view of an example of a microstrip 40 that may be utilized in embodiments of the inventive concepts. As shown, the microstrip 40 includes a conducting line 42 on an upper surface of a thin-film dielectric substrate 41, and a ground plane 43 on a lower surface of the thin-film dielectric substrate 41. When applied in an adiabatic coaxial cable connection according to embodiments of the inventive concepts, the conducting line 42 is connected between the central conductors of opposing coaxial cable ends, and the ground plan 43 is connected between the tubular conducting shields of the opposing coaxial cable ends.

Figure 5:
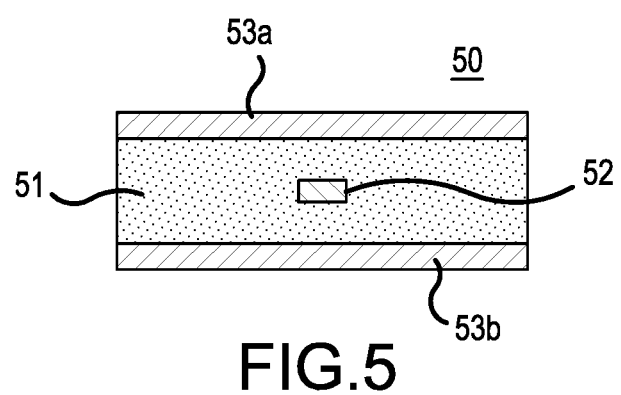
FIG. 5 is a cross-sectional view of a stripline that may constitute a planar transmission line according to an embodiment of the inventive concepts.

FIG. 5 the cross-sectional view of an example of a stripline 50 that may be utilized in embodiments of the inventive concepts. As shown, the stripline 50 includes a conducting line 42 embedded between upper and lower surfaces of a dielectric substrate 51, and at least one of ground planes 53a and 53b on the upper and lower surfaces of a dielectric substrate 51. When applied in an adiabatic coaxial cable connection according to embodiments of the inventive concepts, the conducting line 52 is connected between the central conductors of opposing coaxial cable ends, and the ground plan 53a and/or 53b is connected between the tubular conducting shields of the opposing coaxial cable ends.

Figure 6:
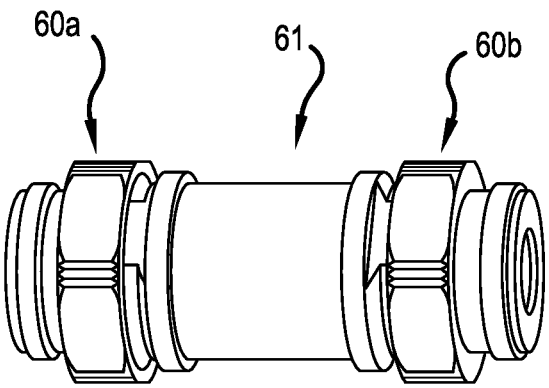
FIG. 6 is a perspective view of a chassis of an adiabatic coaxial cable connector according to an embodiment of the inventive concepts.
Figure 7:
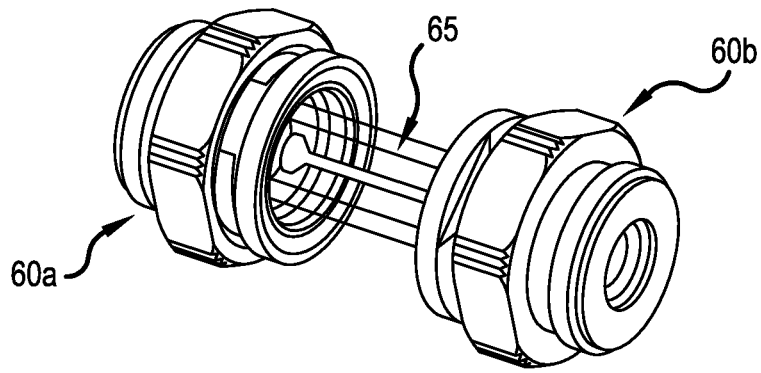
FIGS. 7 and 8 are perspective cut-away views of an adiabatic coaxial cable connector according to an embodiment of the inventive concepts.
Figure 8:
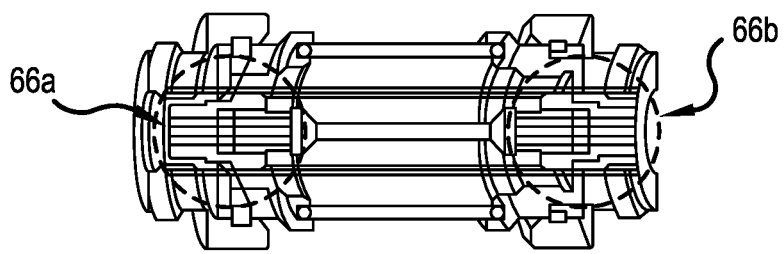

Reference is now made to FIGS. 6 through 8 showing perspective views of an adiabatic coaxial cable connector according to embodiments of the inventive concepts. FIG. 6 is a perspective view of a chassis of an adiabatic coaxial cable connector according to an embodiment of the inventive concepts, and FIGS. 7 and 8 are perspective cut-away views of an adiabatic coaxial cable connector according to an embodiment of the inventive concepts. The connector may be similar in construction that of an attenuator, except it contains no attenuation. That is, as mentioned previously, the structure may be designed to have non-attenuating S-parameters.

The connector of this embodiment includes an outer chassis having a central body 61 surrounding at least a portion of a planar transmission line 65, and opposite coupling nuts 60a and 60b containing at least a portion of the first and second coaxial-to-planar RF connectors 66a and 66b, respectively. One or both of coupling nuts 60a and 60b may be detachably removable (e.g., by interlocking screw threads) from the central body 61. The coaxial-to-planar RF connectors 66a and 66b are configured to mate the conductors of coaxial cables to the planar transmission line 65 as described previously in connection with FIGS. 2 through 5.

The structure of FIGS. 6 through 8 can be applied as an adiabatic component by controlling the thermal characteristics of the materials used in the construction. For example, a thermal conductivity of the chassis (61, 60a, 60b) may be less than 0.300 watts per meter-kelvin. As material examples, the outer chassis (61, 60a, 60b) may be constructed entirely in polycarbonate (having a thermal conductivity of 0.19-0.22 watts per meter-kelvin) or acrylonitrile butadiene styrene ABS (having a thermal conductivity of 0.128-0.187 watts per meter-kelvin), both of which can provide an effective thermal barrier. And, as discussed previously, the material of the dielectric substrate of the planar transmission line 65 may also be selected to have very low thermal conductivity. As examples, a dielectric substrate of fused silica or quartz will result in a thermal conductivity closer to 1 watt per meter-kelvin, thus adding to the adiabatic properties of the connection.

Figure 9:
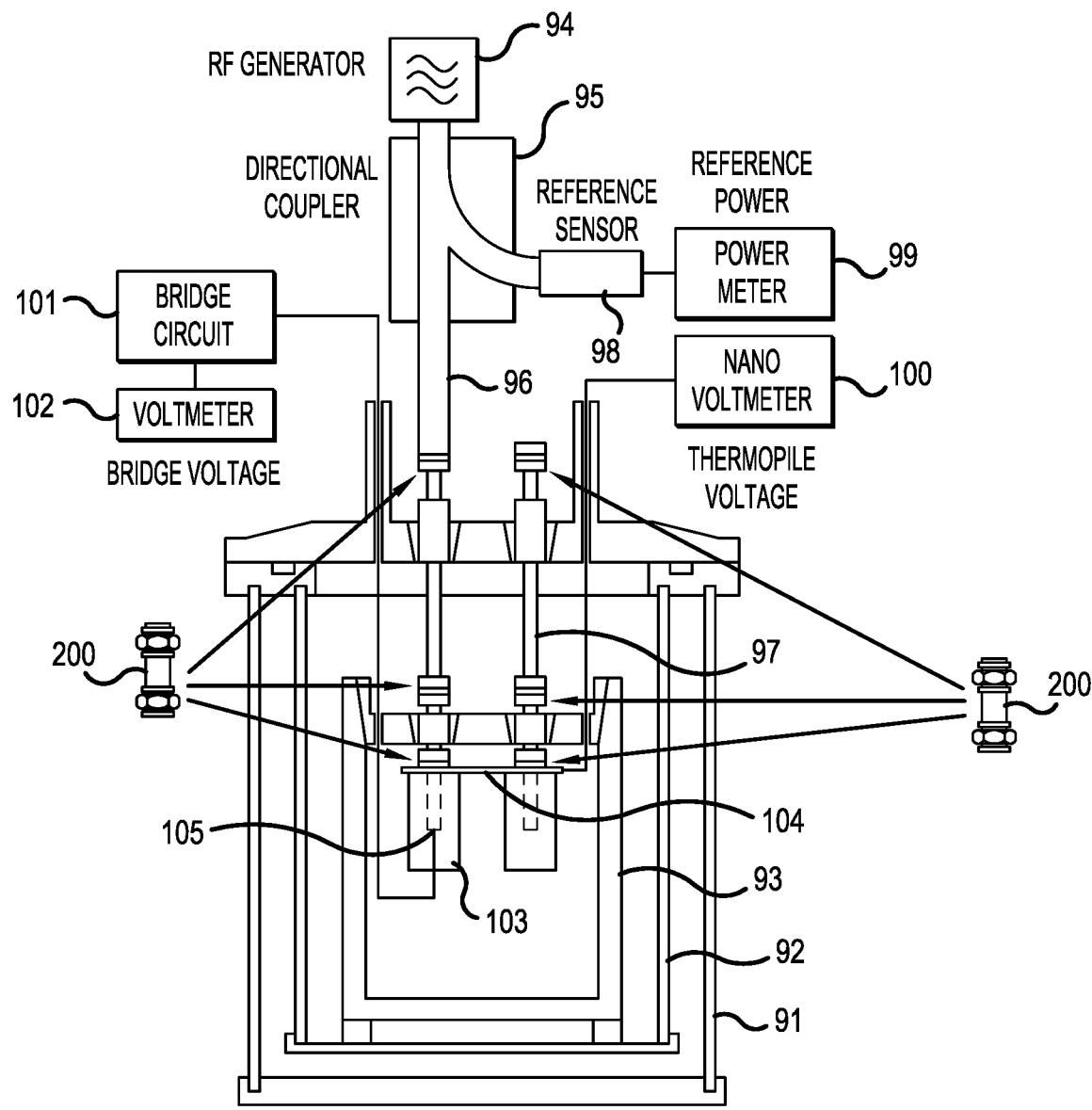
FIG. 9 is a schematic diagram of a calorimeter according to embodiments of the inventive concepts.

FIG. 9 illustrates an example of an adiabatic system that may incorporate adiabatic coaxial cable connections in accordance with one or more embodiments of the inventive concepts. The adiabatic system of this example is an adiabatic microcalorimeter that may be used to measure microwave or RF power.

The adiabatic microcalorimeter of FIG. 9 has a triple-wall chamber structure with insulating material interposed between the walls 91, 92 and 93 for thermal isolation. In addition, thermal stabilization may be enhanced by a Peltier element (not shown) that acts on one of the walls, while other two act as passive thermal shields. Also shown in the figure are several conventional components making up the adiabatic microcalorimeter, i.e., an RF generator 94, a directional coupler 95 for directing an output of the RF generator 94, first and second coaxial RF transmission paths 96 and 97, an RF sensor 98 and a power meter 99 for determining a reference power, a nano-voltmeter 100 for determining a voltage of a thermopile 104, and a bridge circuit 101 and voltmeter 102 for determining a bridge voltage of a thermistor power sensor 103 including a thermistor 105.

To inhibit stray thermal paths through first and second coaxial RF transmission paths 96 and 97, each has been embedded with three (3) in-line adiabatic coaxial cable connectors 200. As described in connection with the previous embodiments, the adiabatic coaxial cable connectors 200 exhibit excellent RF and microwave frequency transmission characteristics, while at the same time offering adiabatic properties.

Figure 10:
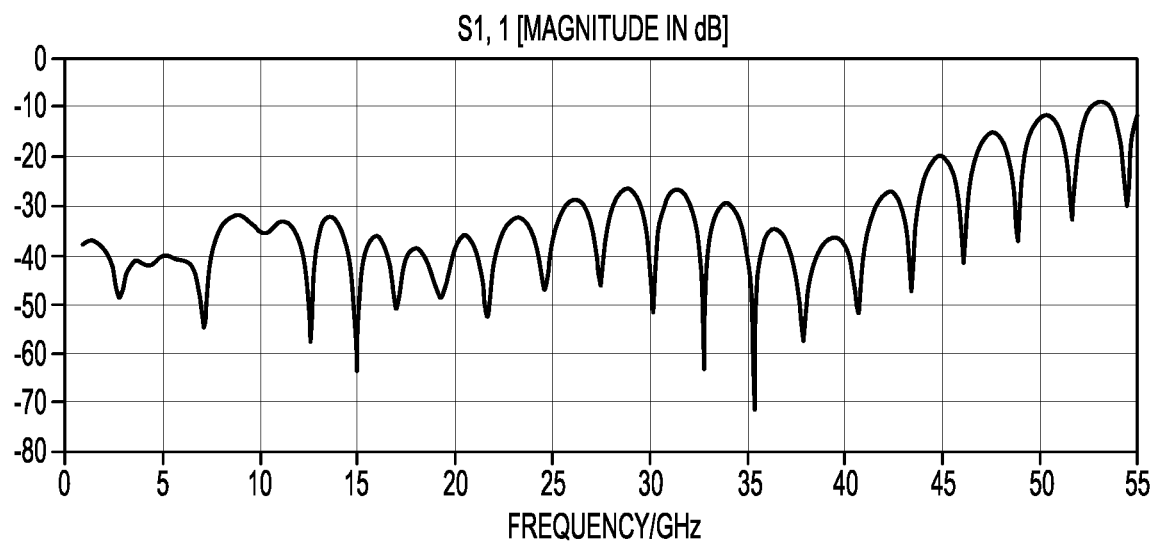
FIGS. 10 and 11 are graphs showing simulated transmission characteristics of an adiabatic coaxial cable connection according to embodiments of the inventive concepts.
Figure 11:
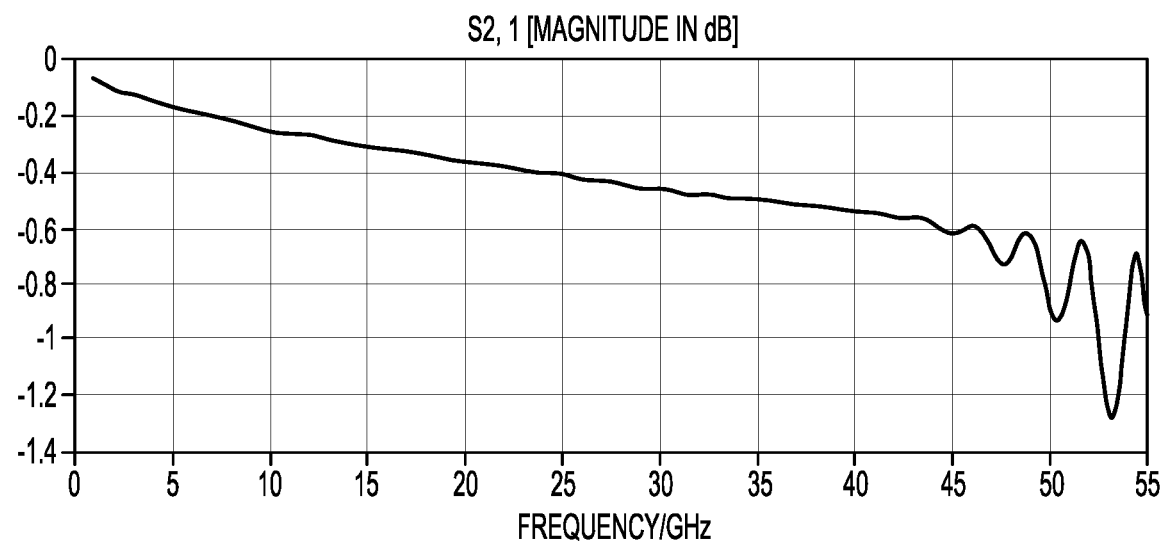

FIGS. 10 and 11 show simulated results for an example of the inventive concepts utilizing a CPW as a planar transmission line. FIG. 10 shows the magnitude in dB of S1,1 over a range of frequencies in the GHz range, and FIG. 11 shows magnitude in dB of S2,1 over that same range of frequencies in the GHz range. These represent what may be considered good performance up to 40 GHz.

While the disclosure references exemplary embodiments, it will be apparent to those skilled in the art that various changes and modifications may be made without departing from the spirit and scope of the present teachings. Therefore, it should be understood that the above embodiments are not limiting, but illustrative.

What is claimed is:

1. An adiabatic coaxial cable connector, comprising:
a chassis comprising a hollow cylindrical body;
a planar transmission line having first and second ends disposed in the hollow cylindrical body of the chassis;
a first coaxial-to-planar transition within the chassis and connected to the first end of the planar transmission line; and
a second coaxial-to-planar transition within the chassis and connected to the second end of the planar transmission line, wherein a ground plane of the planar transmission line is connected between tubular conducting shields of opposing coaxial cable ends.

2. The adiabatic coaxial cable connector of claim 1, wherein the first and second coaxial-to-planar transitions include respective connections exposed at opposite ends of the chassis and each configured to operatively engage the fitting of a coaxial cable.

3. The adiabatic coaxial cable connector of claim 1, wherein a thermal conductivity of the chassis is less than 0.300 watts per meter-kelvin.

4. The adiabatic coaxial cable connector of claim 1, wherein the chassis is formed of plastic.

5. The adiabatic coaxial cable connector of claim 1, wherein the chassis is formed of polycarbonate or acrylonitrile butadiene styrene (ABS).

6. The adiabatic coaxial cable connector of claim 1, wherein the planar transmission line is a coplanar waveguide (CPW), and a substrate of the CPW has a thermal conductivity of less than 5 watts per meter-kelvin.

7. The adiabatic coaxial cable connector of claim 1, wherein the planar transmission line is a coplanar waveguide (CPW), and a substrate of the CPW is formed of at least one of fused silica and quartz.

8. The adiabatic coaxial cable connector of claim 1, wherein the chassis includes a central body surrounding at least a portion of the planar transmission line, and opposite coupling nuts containing at least a portion of the first and second coaxial-to-planar connections, respectively.

9. The adiabatic coaxial cable connector of claim 8, wherein at least one of the coupling nuts is detachably connected to the central body.

10. The adiabatic coaxial cable connector of claim 8, wherein the central body is a cylinder extending lengthwise around the planar transmission line.

11. The adiabatic coaxial cable connector of claim 1, wherein the planar transmission line is one of a microstrip or a stripline.

12. An adiabatic coaxial cable connection, comprising:
a first coaxial cable having a first end;
a second coaxial cable having a second end; and
a coaxial cable connector including a planar transmission line, the planar transmission line operatively connected between the first and second ends of the respective first and second coaxial cables, wherein the coaxial cable connection includes a chassis comprising a hollow cylindrical body and containing the planar transmission line disposed in the hollow cylindrical body of the chassis, the chassis having a thermal conductivity of less than 0.300 watts per meter-kelvin, wherein a around plane of the planar transmission line is connected between the tubular conducting shields of opposing coaxial cable ends.

13. The adiabatic coaxial cable connection system of claim 12, wherein the planar transmission line includes a substrate having a thermal conductivity of less than 5 watts per meter-kelvin.

14. The adiabatic coaxial cable connection system of claim 13, wherein the chassis is formed of polycarbonate or acrylonitrile butadiene styrene (ABS), and a substrate of the planar transmission line is formed of fuse silica or quartz.

15. The adiabatic coaxial cable connection system of claim 12, wherein the planar transmission line is a coplanar waveguide (CPW).

16. The adiabatic coaxial cable connection system of claim 12, wherein the planar transmission line is a microstrip or a stripline.

17. An adiabatic system, comprising:
a chamber including a chamber wall and defining a thermodynamically controlled process space;
a test sensor located within the thermodynamically controlled process space;
an RF generator located external the thermodynamically controlled process space; a coaxial cable connector comprising a chassis having a hollow cylindrical body, a planar transmission line disposed in the hollow cylindrical body of the chassis and having first and second ends, a first coaxial-to-planar transition within the chassis and connected to the first end of the planar transmission line, and a second coaxial-to-planar transition within the chassis and connected to the second end of the planar transmission line;
a first coaxial cable coupled between the test sensor and the first coaxial-to-planar transition of the coaxial cable connector, wherein a ground plane of the planar transmission line is connected between the tubular conducting shields of an end of the first coaxial cable; and
a second coaxial cable coupled between the RF generator and the second coaxial-to-planar transition of the coaxial cable connector, wherein the ground plane of the planar transmission line is connected between the tubular conducting shields of the second coaxial cable ends.

18. The adiabatic system of claim 17, wherein a thermal conductivity of the chassis is less than 0.300 watts per meter-kelvin, and a substrate of the planar transmission line has a thermal conductivity of less than 5 watts per meter-kelvin.

19. The adiabatic system of claim 17, wherein adiabatic system is a microcalorimeter.

* * * * *